US009609905B1

(12) United States Patent
Leko et al.

(10) Patent No.: US 9,609,905 B1
(45) Date of Patent: Apr. 4, 2017

(54) BICYCLE SHOE/PEDAL SYSTEM

(71) Applicants: Frank M. Leko, Safety Harbor, FL (US); Mike C. Lohmeyer, Safety Harbor, FL (US)

(72) Inventors: Frank M. Leko, Safety Harbor, FL (US); Mike C. Lohmeyer, Safety Harbor, FL (US)

( * ) Notice: Subject to any disclaimer, the term of this patent is extended or adjusted under 35 U.S.C. 154(b) by 0 days.

(21) Appl. No.: 15/261,318

(22) Filed: Sep. 9, 2016

Related U.S. Application Data

(60) Provisional application No. 62/245,041, filed on Oct. 22, 2015, provisional application No. 62/218,229, filed on Sep. 14, 2015.

(51) Int. Cl.
*A43B 5/14* (2006.01)
*A43B 13/12* (2006.01)
*B62M 3/08* (2006.01)

(52) U.S. Cl.
CPC .............. *A43B 5/14* (2013.01); *A43B 13/122* (2013.01); *B62M 3/086* (2013.01)

(58) Field of Classification Search
CPC .................................. A43B 5/14; B62M 3/086
USPC ........................................................... 36/131
See application file for complete search history.

(56) References Cited

U.S. PATENT DOCUMENTS

| 589,443 | A | * | 9/1897 | Rathbun | A43C 15/161 36/131 |
|---|---|---|---|---|---|
| 4,685,351 | A | * | 8/1987 | Pegg | B62M 3/086 36/131 |
| 4,907,469 | A | * | 3/1990 | Gobbi | A43B 5/14 36/131 |
| 4,942,778 | A | * | 7/1990 | Bryne | B62M 3/086 36/131 |
| 7,540,101 | B2 | * | 6/2009 | Harrington | A43B 5/14 36/131 |
| 8,074,381 | B2 | * | 12/2011 | Harrington | A43B 5/14 36/131 |
| 2007/0000153 | A1 | * | 1/2007 | Harrington | A43B 5/14 36/131 |
| 2014/0251078 | A1 | * | 9/2014 | Emerson | A43B 5/14 74/594.6 |

FOREIGN PATENT DOCUMENTS

EP     0218731     * 10/1985

* cited by examiner

*Primary Examiner* — Marie Bays

(57) ABSTRACT

A supplemental sole is adapted to be secured to a sole of a shoe for releasable coupling to a cylindrical pedal of a bicycle. An operational assembly formed in the supplemental sole includes a housing with a forwardly facing chamber. A sleeve is within the forwardly facing chamber. A primary lever pivotally coupled to the housing has a forward region movable between a lowered release orientation beneath the chamber and a raised locked orientation securing the sleeve within the forwardly facing chamber. A trigger is axially reciprocable within the housing. The trigger has a forward end located in the chamber when in the release orientation. The forward end is located rearwardly of the chamber when slid rearwardly by the pedal for raising the primary lever to the locked orientation.

8 Claims, 6 Drawing Sheets

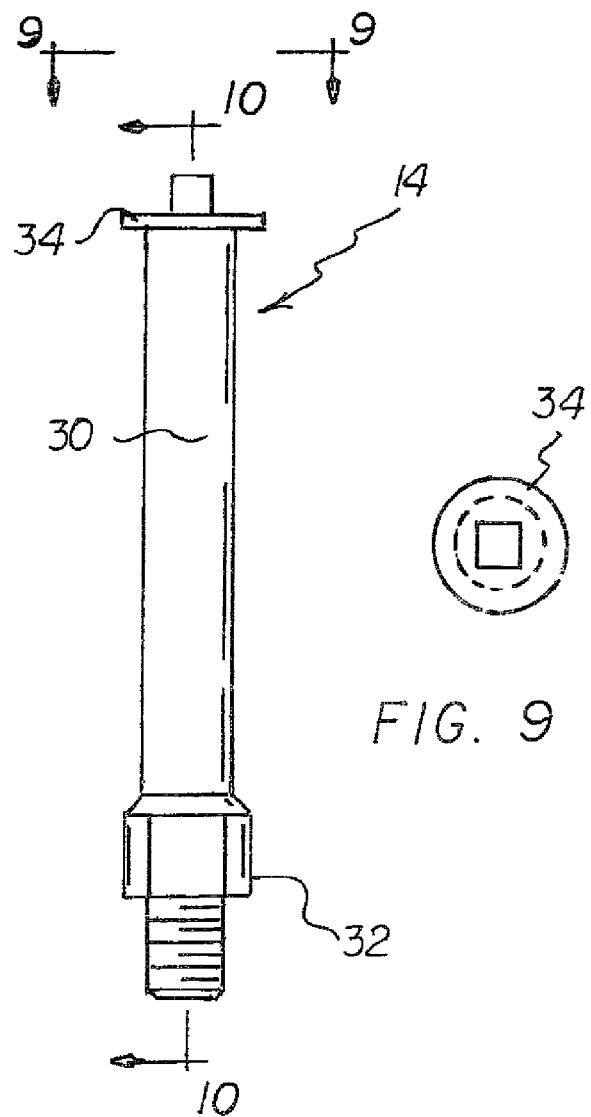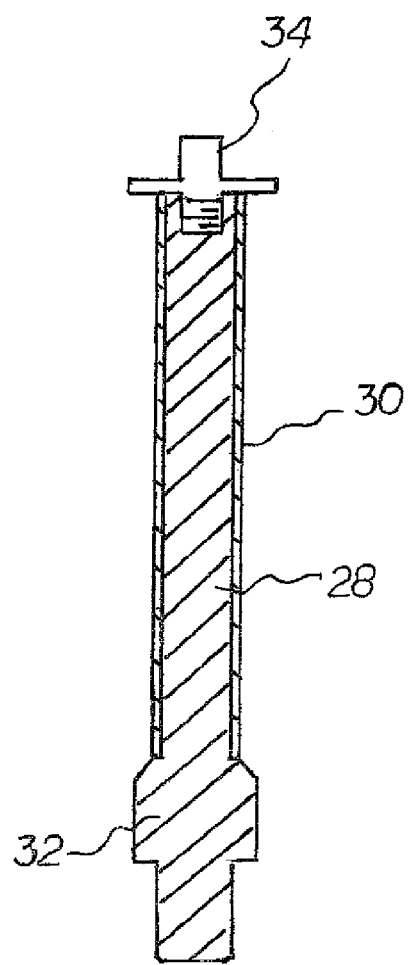
FIG. 8
FIG. 9
FIG. 10

BICYCLE SHOE/PEDAL SYSTEM

RELATED APPLICATION

The present non-provisional patent application is based upon Provisional Application No. 62/218,229 filed Sep. 14, 2015 and Provisional Application No. 62/245,041 filed Oct. 22, 2015, the priority of which applications is hereby claimed and the subject matter of which applications is incorporated herein by reference.

BACKGROUND OF THE INVENTION

Field of the Invention

The present invention relates to a bicycle shoe/pedal system and more particularly pertains to removably coupling a shoe of a user to a pedal of a bicycle and to minimizing the time and accuracy needed for re-coupling the shoe to the pedal after a stop. The removable coupling and the re-coupling are done in a safe, convenient, and economical manner.

Description of the Prior Art

The use of bicycle shoe/pedal systems of known designs and configurations is known in the prior art. More specifically, bicycle shoe/pedal systems of known designs and configurations previously devised and utilized for the purpose of coupling a shoe to a bicycle pedal are known to consist basically of familiar, expected, and obvious structural configurations, notwithstanding the myriad of designs encompassed by the crowded prior art which has been developed for the fulfillment of countless objectives and requirements.

While these devices fulfill their respective, particular objectives and requirements, the aforementioned patents do not describe a bicycle shoe/pedal system that allows removably coupling a shoe to a bicycle pedal and minimize the time and accuracy needed for re-coupling the shoe to the pedal after a stop, the removable coupling and re-coupling being done in a safe, convenient, and economical manner.

In this respect, the bicycle shoe/pedal system according to the present invention substantially departs from the conventional concepts and designs of the prior art, and in doing so provides an apparatus primarily developed for the purpose of removably coupling a shoe to a bicycle pedal and minimize the time and accuracy needed for re-coupling the shoe to the pedal after a stop, the removable coupling and re-coupling being done in a safe, convenient, and economical manner.

Therefore, it can be appreciated that there exists a continuing need for a new and improved bicycle shoe/pedal system which can be used for removably coupling a shoe to a bicycle pedal and minimize the time and accuracy needed for re-coupling the shoe to the pedal after a stop, the removable coupling and re-coupling being done in a safe, convenient, and economical manner. In this regard, the present invention substantially fulfills this need.

SUMMARY OF THE INVENTION

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

To attain this, the present invention essentially comprises a supplemental sole, an operational assembly, and a trigger. From a broad viewpoint, the present invention is a bicycle shoe/pedal system. A supplemental sole is adapted to be secured to a sole of a shoe for releasable coupling to a cylindrical pedal of a bicycle. An operational assembly formed in the supplemental sole includes a housing with a forwardly facing chamber. A sleeve is within the forwardly facing chamber. A primary lever pivotally coupled to the housing has a forward region movable between a lowered release orientation beneath the chamber and a raised locked orientation securing the sleeve within the forwardly facing chamber. A trigger is axially reciprocable within the housing. The trigger has a forward end located in the chamber when in the release orientation. The forward end is located rearwardly of the chamber when slid rearwardly by the pedal for raising the primary lever to the locked orientation. There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the invention be regarded as including such equivalent constructions insofar as they do not depart from the spirit and scope of the present invention.

It is therefore an object of the present invention to provide a new and improved bicycle shoe/pedal system which has all of the advantages of the prior art bicycle shoe/pedal systems of known designs and configurations and none of the disadvantages.

It is another object of the present invention to provide a new and improved bicycle shoe/pedal system which may be easily and efficiently manufactured and marketed.

It is further object of the present invention to provide a new and improved bicycle shoe/pedal system which is of durable and reliable constructions.

An even further object of the present invention is to provide a new and improved bicycle shoe/pedal system which is susceptible of a low cost of manufacture with regard to both materials and labor, and which accordingly is then susceptible of low prices of sale to the consuming public, thereby making such bicycle shoe/pedal system economically available to the buying public.

Even still another object of the present invention is to provide a bicycle shoe/pedal system for removably coupling a shoe to a bicycle pedal and minimize the time and accuracy needed for re-coupling the shoe to the pedal after a stop, the removable coupling and re-coupling being done in a safe, convenient, and economical manner.

Lastly, it is an object of the present invention to provide a new and improved bicycle shoe/pedal system for removably coupling a shoe of a user to a pedal of a bicycle and to minimize the time and accuracy needed for re-coupling the shoe to the pedal after a stop. The removable coupling and the re-coupling are done in a safe, convenient and economical manner.

These together with other objects of the invention, along with the various features of novelty which characterize the invention, are pointed out with particularity in the claims annexed to and forming a part of this disclosure.

For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 8 is a plan view of the sleeve supported on the shaft.

FIG. 9 is an end view of the shaft and the sleeve taken along line 9-9 of FIG. 8.

FIG. 10 is a cross sectional view of the shaft and the sleeve taken along line 10-10 of FIG. 8.

The same reference numerals refer to the same parts throughout the various Figures.

DESCRIPTION OF THE PREFERRED EMBODIMENT

Figure 1:
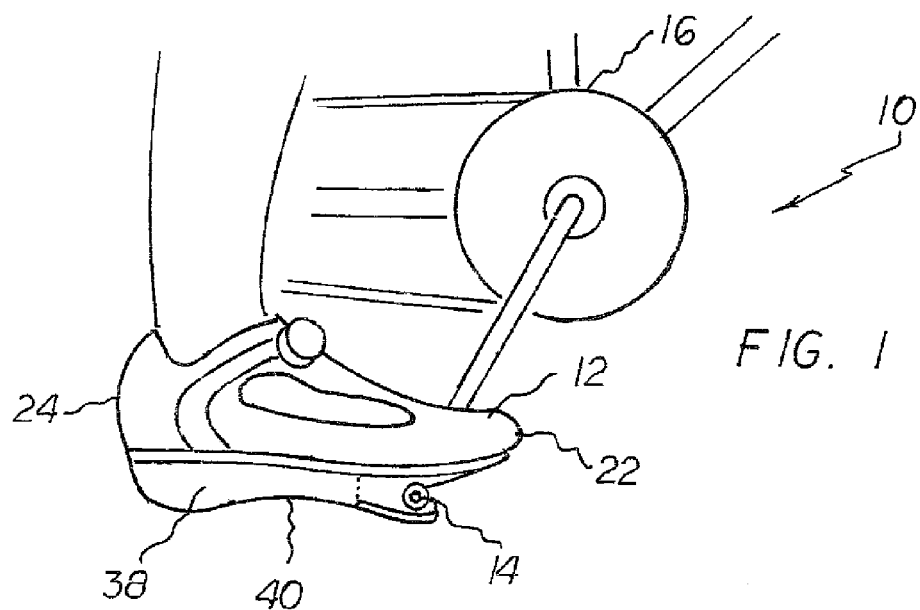
FIG. 1 is a side elevational view of a bicycle shoe/pedal system constructed in accordance with the principles of the present invention.
Figure 2:
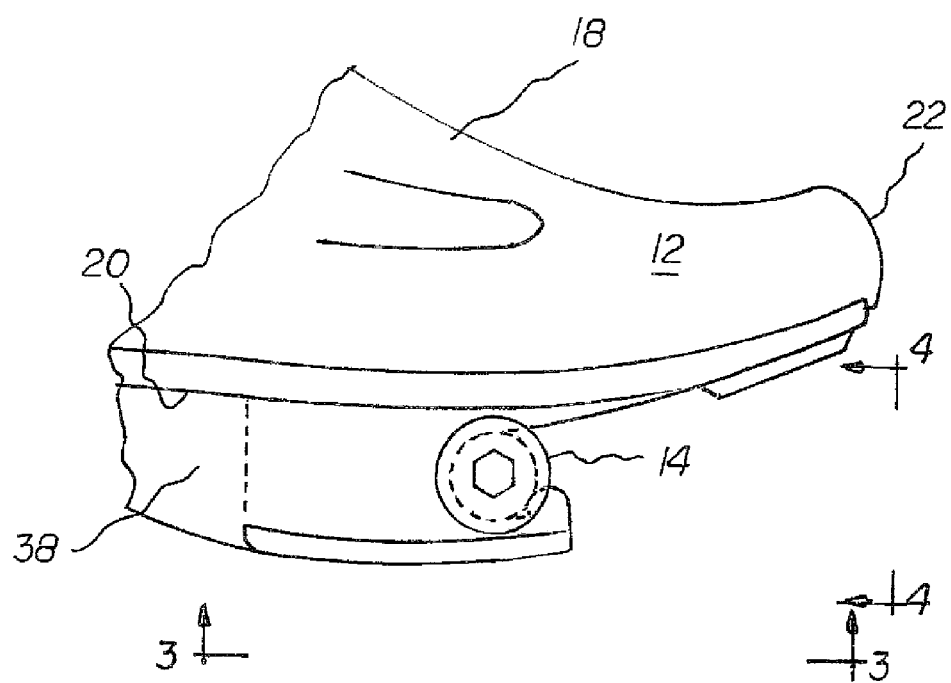
FIG. 2 is an enlarged showing of the coupling between the pedal and the shoe.
Figure 3:
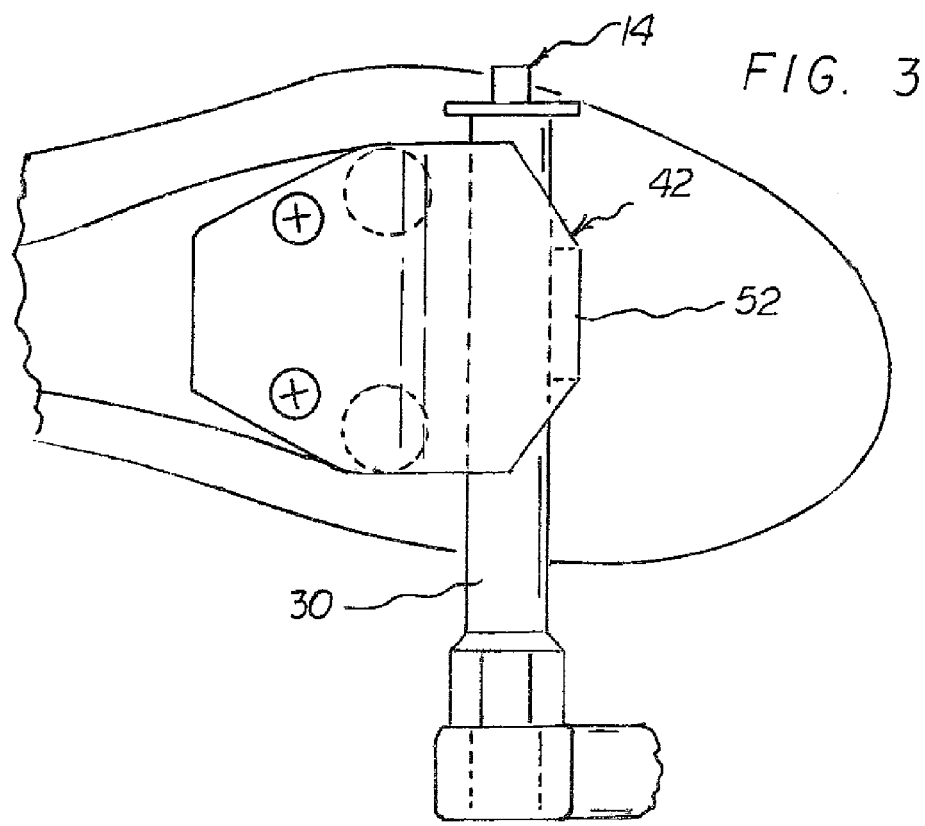
FIG. 3 is a bottom view of a portion of the system taken along line 3-3 of FIG. 2.
Figure 4:
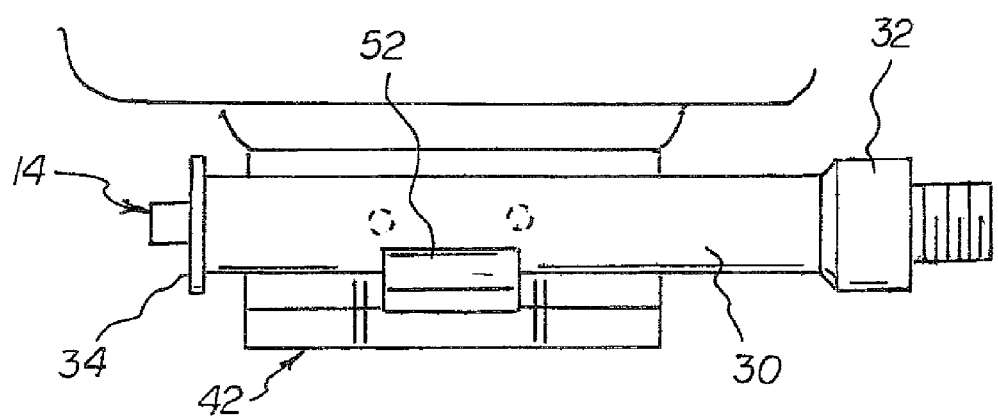
FIG. 4 is a front elevational view of a portion of the system taken along line 4-4 of FIG. 2.
Figure 5:
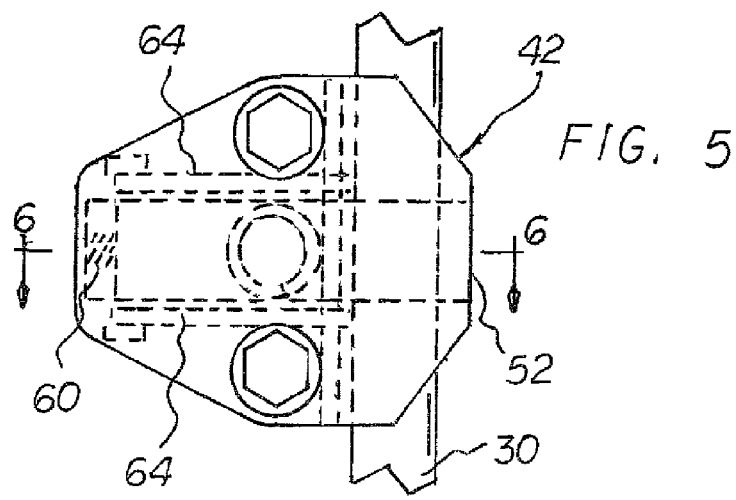
FIG. 5 is a plan view of a portion of the system taken along line 5-5 of FIG. 4.
Figure 6:
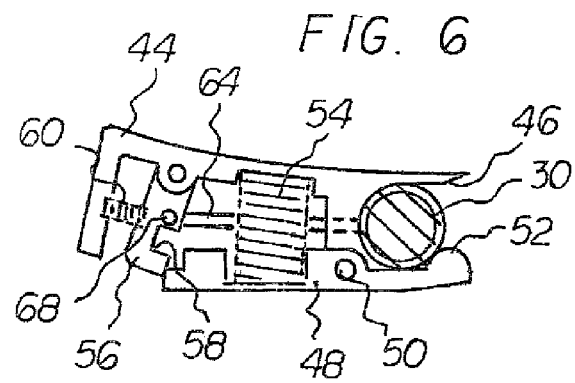
FIG. 6 is a cross sectional view taken along line 6-6 of FIG. 5, the system being in a locked orientation.
Figure 7:
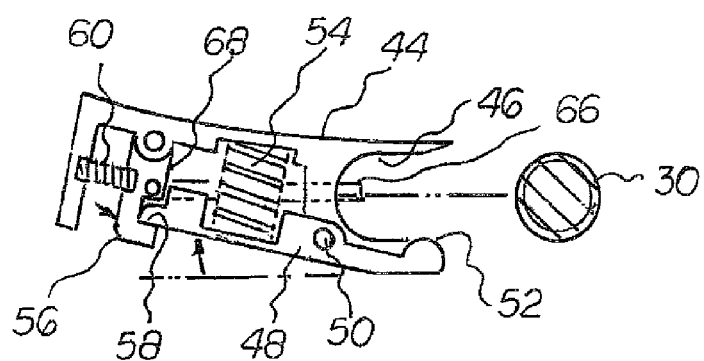
FIG. 7 is a cross sectional view similar to FIG. 6, the system being in a release orientation.
Figure 11:
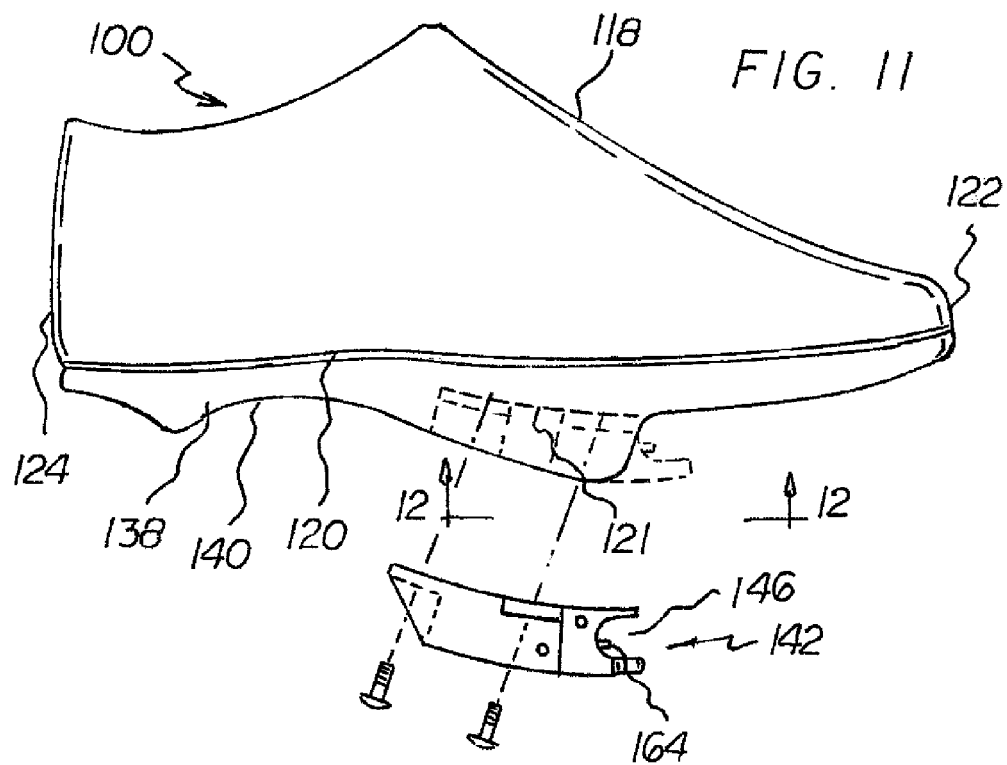
FIG. 11 is a side elevational view of a bicycle shoe/pedal system constructed in accordance with an alternate embodiment of the present invention.
Figure 12:
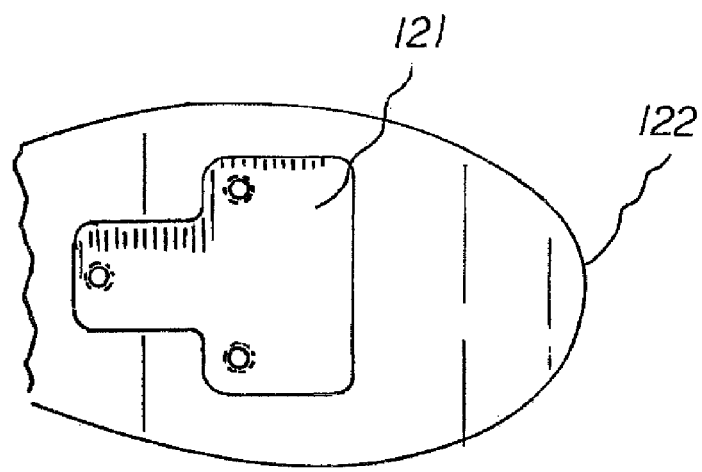
FIG. 12 is a bottom view of a portion of the system taken along line 12-12 of FIG. 11.
Figure 13:
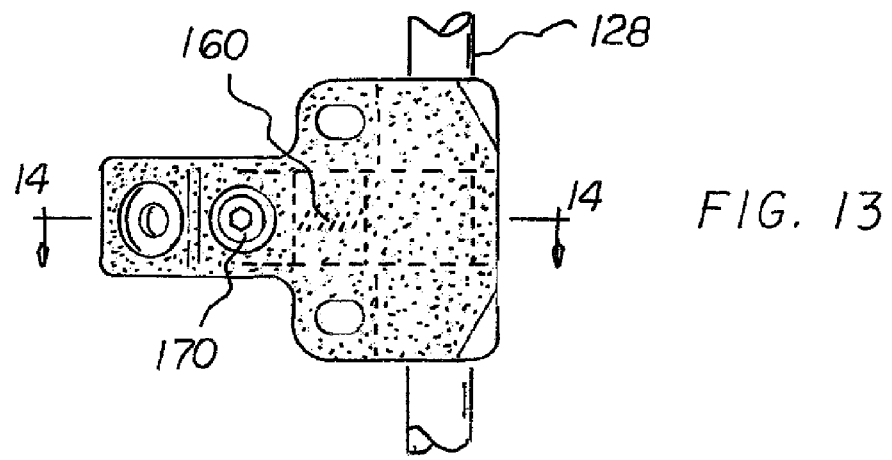
FIG. 13 is a bottom view of a portion of the system similar to FIG. 12 but with the operational assembly in place.
Figure 14:
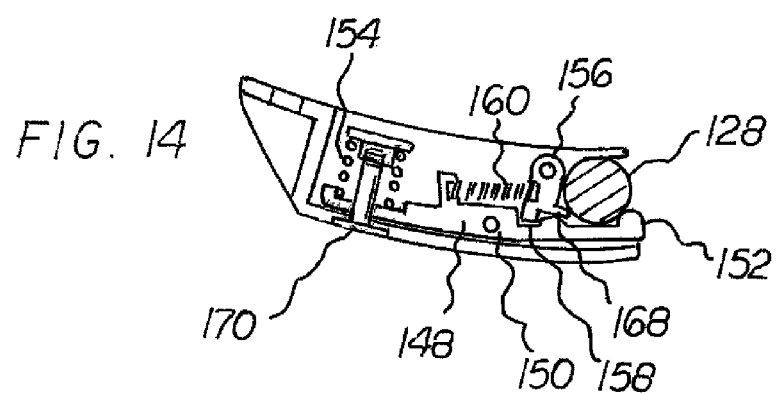
FIG. 14 is a cross sectional view taken along line 14-14 of FIG. 13, the system being in a locked orientation.
Figure 15:
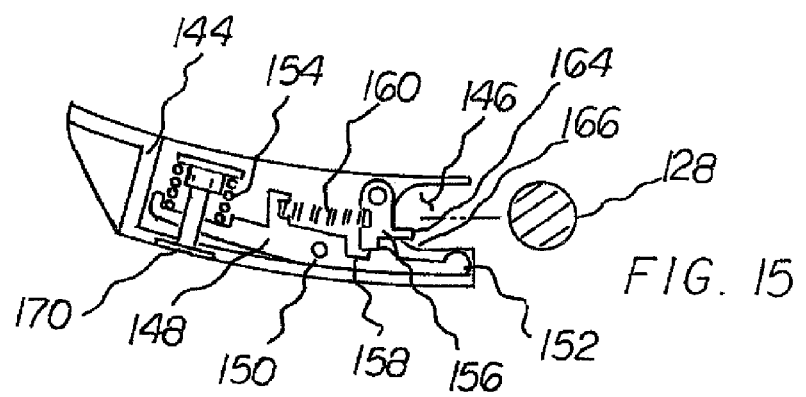
FIG. 15 is a cross sectional view similar to FIG. 14, the system being in a release orientation.

With reference now to the drawings, and in particular to FIG. 1 thereof, the preferred embodiment of the bicycle shoe/pedal system embodying the principles and concepts of the present invention and generally designated by the reference numeral 10 will be described.

The present invention, the bicycle shoe/pedal system 10 is comprised of a plurality of components. Such components in their broadest context include a supplemental sole, an operational assembly, and a trigger. Such components are individually configured and correlated with respect to each other so as to attain the desired objective.

From a specific viewpoint, the present invention is a bicycle shoe/pedal system 10 for removably coupling a shoe 12 of a user to a pedal 14 of a bicycle 16 and to minimize the time and accuracy needed for re-coupling the shoe to the pedal after a stop. The removable coupling and the re-coupling are done in a safe, convenient, and economical manner.

The shoe has an upwardly facing upper 18 and a downwardly facing sole 20. The shoe has a forwardly facing toe 22 and a rearwardly facing heel 24. The upper and the sole together have a maximum shoe height adjacent to a central extent between the toe and the heel.

The pedal 14 has a central shaft 28. The central shaft is cylindrical in configuration. The pedal is adapted to be moved by the user to propel the bicycle in a direction of motion. The shaft has an axis perpendicular to a direction of movement. The pedal has a sleeve 30. The sleeve is hollow and cylindrical in configuration. The sleeve encompasses the shaft. The sleeve is adapted for rotational movement around the shaft. A fixed collar 32 and a bolt with a removable collar 34 bounding the shaft are provided for abating axial movement of the sleeve with respect to the shaft.

Provided next is a supplemental sole 38. The supplemental sole is secured to the sole of the shoe. The supplemental sole extends from the heel to a location adjacent to the toe. The supplemental sole has a transverse recess 40. The transverse recess is located at an intermediate extent of the supplemental sole. The supplemental sole has a maximum height rearwardly of the transverse recess. The maximum height of the supplemental sole is from 20 percent to 30 percent of the maximum shoe height to facilitate walking.

Further provided is an operational assembly 42. The operational assembly is formed in the supplemental sole forwardly of the transverse recess. The operational assembly includes a housing 44. The housing has a forwardly facing C-shaped chamber 46 of a size to removably receive the sleeve. The operational assembly has a primary lever 48. The primary lever has a central extent 50 pivotally coupled to the housing. The primary lever has a rearward region rearwardly of the central extent. The primary lever has a forward region forwardly of the central extent with an enlarged tip 52. The forward region is movable to a lowered release orientation beneath the C-shaped chamber. The forward region is movable to a raised locked orientation with the enlarged tip securing the sleeve within the C-shaped chamber. A primary spring 54 is located between the housing and the rearward region of the primary lever. In this manner the enlarged tip is urged to the raised locked orientation. The operational assembly includes a secondary lever 56. The secondary lever has an upper end is pivotally coupled to the housing rearwardly of the primary spring. The secondary lever has a forwardly facing notch 58. The forwardly facing notch removably receives the rearward extent of the primary lever. Secondary springs 60 urge the secondary lever forwardly. Further in this manner the rearward extent of the primary lever is retained in the notch.

Provided last is a trigger. The trigger is formed of two rods 64. The two rods are axially reciprocable in the direction of movement within the housing on opposite sides of the primary spring. The two rods each have a forward end 66. The forward end is located in the C-shaped chamber when in the release orientation. The forward end is located rearwardly of the C-shaped chamber when slid rearwardly by the sleeve to the locked orientation. The two rods each have a rearward end 68. The rearward end is coupled to a central extent of the secondary lever for moving the secondary lever forwardly when in the locked orientation and for moving the secondary lever rearwardly when in the release orientation.

A second embodiment of the invention, the primary embodiment, is illustrated in FIGS. 11-15. Such embodiment is a bicycle shoe/pedal system 100 for removably coupling a shoe 112 of a user to a pedal 114 of a bicycle 116 and for minimizing the time and accuracy needed for re-coupling the shoe to the pedal after a stop. The removable coupling and the re-coupling is done in a safe, convenient, and economical manner.

In this primary embodiment a shoe 112 is provided. The shoe has an upwardly facing upper 118, a downwardly facing sole 120, a forwardly facing toe 122, and a rearwardly facing heel 124. The upper and the sole together have a maximum shoe height adjacent to a central extent between the toe and the heel.

A pedal 114 is next provided. The pedal has a central shaft 128 in a cylindrical configuration. The pedal is adapted to be moved by the user to propel the bicycle 116 in a direction of motion. The shaft has an axis perpendicular to a direction of movement. The pedal has a sleeve 130 in a hollow cylindrical configuration encompassing the shaft and adapted for rotational movement around the shaft. A fixed collar 132 and a bolt with a removable collar 134 bounding the shaft functions for abating axial movement of the sleeve with respect to the shaft.

A supplemental sole 138 is secured to the sole of the shoe. The supplemental sole extends from the heel to a location adjacent to the toe. The supplemental sole has a transverse recess 140 at an intermediate extent of the supplemental sole. The supplemental sole has a maximum height rearwardly of the transverse recess. The maximum height of the supplemental sole is from 20 percent to 30 percent of the maximum shoe height to facilitate walking.

An operational assembly 142 is next provided. The operational assembly is formed in the supplemental sole forwardly of the transverse recess. The operational assembly includes a housing 144 with a forwardly facing C-shaped chamber 146 of a size to removably receive the central shaft. The operational assembly has a primary lever 148 with a central extent 150 pivotally coupled to the housing. The primary lever has a rearward region rearwardly of the central extent. The primary lever has a forward region forwardly of the central extent with an enlarged tip 152. The forward region is movable between a lowered release orientation beneath the chamber and a raised locked orientation with the enlarged tip securing the pedal within the chamber. A primary spring is located between the housing and the rearward region of the primary lever urging the enlarged tip to the raised locked orientation. A secondary lever 156 has an upper end pivotally coupled to the housing forwardly of the primary spring. The secondary lever has an upwardly facing notch 158 removably receiving a lower extent of the secondary lever. A secondary spring 160 urges the secondary lever forwardly to retain the forward extent of the primary lever beneath the chamber.

A trigger 164 is next provided. The trigger is formed of a bar axially reciprocable in a direction of movement within the housing. The bar has a forward end 166 located in the C-shaped chamber when in the release orientation. The forward end is located rearwardly of the chamber when slid rearwardly by the central shaft to the locked orientation. The bar has a rearward end 168 coupled to a central extent of the secondary lever for moving the secondary lever forwardly when in the locked orientation and for moving the secondary lever rearwardly when in the release orientation.

An adjustment bolt 170 has a downwardly facing head with a hexagonal recess adapted to be twisted by a user to increase and decrease the tension on the primary spring. This allows the user to change the force needed to lock and unlock the system.

Note is taken that the operational components are adapted to be applied to a conventional shoe. In such circumstance, the conventional shoe preferably has a heel or an additional heel component of appropriate height is added to facilitate more comfortable walking.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A bicycle shoe/pedal system comprising:
   a supplemental sole adapted to be secured to a sole of a shoe for releasable coupling to a cylindrical pedal of a bicycle;
   an operational assembly formed in the supplemental sole, the operational assembly including a housing with a forwardly facing chamber, a sleeve within the forwardly facing chamber, the operational assembly having a primary lever pivotally coupled to the housing, the primary lever having a forward region movable between a lowered release orientation beneath the chamber and a raised locked orientation securing the sleeve within the forwardly facing chamber; and
   a trigger axially reciprocable within the housing, the trigger having a forward end located in the chamber when in the release orientation, the forward end located rearwardly of the chamber when slid rearwardly by the pedal for raising the primary lever to the locked orientation.

2. The system as set forth in claim 1 and further including a shoe with a sole and a toe and a heel and a central extent and wherein the supplemental sole is permanently attached to the sole of the shoe.

3. The system as set forth in claim 1 wherein the primary lever has a central extent pivotally coupled to the housing, the primary lever having a rearward region rearwardly of the central extent, the primary lever having a forward region forwardly of the central extent with an enlarged tip, the forward region being movable between a lowered release orientation beneath the chamber and a raised locked orientation with the enlarged tip securing the pedal within the chamber, a primary spring between the housing and the rearward region of the primary lever urging the enlarged tip to the raised locked orientation, a trigger having an upper end pivotally coupled to the housing rearwardly of the primary spring, the trigger having a forwardly facing notch removably receiving the rearward extent of the primary lever, a secondary spring urging the trigger forwardly to retain the rearward extent of the primary lever in the notch.

4. The system as set forth in claim 3 wherein the trigger is formed of two rods axially reciprocable in a direction of movement within the housing on opposite sides of the primary spring, the two rods each having a forward end located in the C-shaped chamber when in the release orientation, the forward ends located rearwardly of the chamber when slid rearwardly by the pedal to the locked orientation, the two rods each having a rearward end coupled to a central extent of the trigger for moving the trigger forwardly when in the locked orientation and for moving the trigger rearwardly when in the release orientation.

5. The system as set forth in claim 1 wherein the primary lever has a central extent pivotally coupled to the housing, the primary lever having a rearward region rearwardly of the central extent, the primary lever having a forward region forwardly of the central extent with an enlarged tip, the forward region being movable between the lowered release orientation beneath the chamber and the raised locked orientation with the enlarged tip securing the pedal within the chamber, a primary spring between the housing and the rearward region of the primary lever urging the enlarged tip to the raised locked orientation, a trigger having an upper end pivotally coupled to the housing forwardly of the primary spring, the trigger having an upwardly facing notch removably receiving a lower extent of the trigger, a secondary spring urging the trigger forwardly to retain the forward extent of the primary lever beneath the chamber.

6. The system as set forth in claim 5 wherein the trigger is formed of a bar axially reciprocable in a direction of movement within the housing, the bar having a forward end located in the C-shaped chamber when in a release orientation, the forward end located rearwardly of the chamber when slid rearwardly by the central shaft to the locked orientation, the bar having a rearward end coupled to a central extent of the trigger for moving the secondary trigger forwardly when in the locked orientation and for moving the secondary trigger rearwardly when in the release orientation.

7. A bicycle shoe/pedal system (10) for removably coupling a shoe (12) of a user to a pedal (14) of a bicycle (16) and to minimize the time and accuracy needed for re-coupling the shoe to the pedal after a stop, the removably coupling and the re-coupling being done in a safe, convenient, and economical manner, the system comprising, in combination the shoe (12) having an upwardly facing upper (18) and a downwardly facing sole (20), the shoe having a forwardly facing toe (22) and a rearwardly facing heel (24), the upper and the sole together having a maximum shoe height adjacent to a central extent between the toe and the heel;

the pedal (14) having central shaft (28) in a cylindrical configuration, the pedal adapted to be moved by the user to propel the bicycle (16) in a direction of motion, the shaft having an axis perpendicular to a direction of movement, the pedal having a sleeve (30) in a hollow cylindrical configuration encompassing the shaft and adapted for rotational movement around the shaft, a fixed collar (32) and a bolt with a removable collar (34) bounding the shaft for abating axial movement of the sleeve with respect to the shaft;

a supplemental sole (38) secured to the sole of the shoe, the supplemental sole extending from the heel to a location adjacent to the toe, the supplemental sole having a transverse recess (40) at an intermediate extent of the supplemental sole, the supplemental sole having a maximum height rearwardly of the transverse recess, the maximum height of the supplemental sole being from 20 percent to 30 percent of the maximum shoe height to facilitate walking;

an operational assembly (42) formed in the supplemental sole forwardly of the transverse recess, the operational assembly including a housing (44) with a forwardly facing C-shaped chamber (46) of a size to removably receive the sleeve, the operational assembly having a primary lever (48) with a central extent (50) pivotally coupled to the housing, the primary lever having a rearward region rearwardly of the central extent, the primary lever having a forward region forwardly of the central extent with an enlarged tip (52), the forward region movable to a lowered release orientation beneath the C-shaped chamber, the forward region movable to a raised locked orientation with the enlarged tip securing the sleeve within the C-shaped chamber, a primary spring (54) between the housing and the rearward region of the primary lever urging the enlarged tip to the raised locked orientation, a secondary trigger (56) having an upper end pivotally coupled to the housing rearwardly of the primary spring, the secondary trigger having a forwardly facing notch 58 removably receiving the rearward extent of the primary lever, secondary spring (60) urging the secondary trigger forwardly to retain the rearward extent of the primary lever in the notch, and a trigger formed of two rods (64) axially reciprocable in the direction of movement within the housing on opposite sides of the primary spring, the two rods each having a forward end (66) located in the C-shaped chamber when in the release orientation, the forward ends located rearwardly of the C-shaped chamber when slid rearwardly by the sleeve to the locked orientation, the two rods each having a rearward end (68) coupled to a central extent of the secondary trigger for moving the secondary trigger forwardly when in the locked orientation and for moving the secondary trigger rearwardly when in the release orientation.

8. A bicycle shoe/pedal system (100) for removably coupling a shoe (112) of a user to a pedal (114) of a bicycle (116) and to minimize the time and accuracy needed for re-coupling the shoe to the pedal after a stop, the removably coupling and the re-coupling being done in a safe, convenient, and economical manner, the system comprising, in combination the shoe (112) having an upwardly facing upper (118) and a downwardly facing sole (120), the shoe having a forwardly facing toe (122) and a rearwardly facing heel (124), the upper and the sole together having a maximum shoe height adjacent to a central extent between the toe and the heel;

the pedal (114) having central shaft (128) in a cylindrical configuration, the pedal adapted to be moved by the user to propel the bicycle (116) in a direction of motion, the shaft having an axis perpendicular to a direction of movement, the pedal having a sleeve (130) in a hollow cylindrical configuration encompassing the shaft and adapted for rotational movement around the shaft, a fixed collar (132) and a bolt with a removable collar (134) bounding the shaft for abating axial movement of the sleeve with respect to the shaft; and a supplemental sole (138) secured to the sole of the shoe, the supplemental sole extending from the heel to a location adjacent to the toe, the supplemental sole having a transverse recess (140) at an intermediate extent of the supplemental sole, the supplemental sole having a maximum height rearwardly of the transverse recess, the maximum height of the supplemental sole being from 20 percent to 30 percent of the maximum shoe height to facilitate walking;

an operational assembly (142) formed in the supplemental sole forwardly of the transverse recess, the operational assembly including a housing (144) with a forwardly facing C-shaped chamber (146) of a size to removably receive the central shaft, the operational assembly having a primary lever (148) has a central extent (150) pivotally coupled to the housing, the primary lever having a rearward region rearwardly of the central extent, the primary lever having a forward region forwardly of the central extent with an enlarged tip (152), the forward region being movable between the lowered release orientation beneath the chamber and the raised locked orientation with the enlarged tip securing the pedal within the chamber, a primary spring between the housing and the rearward region of the primary lever urging the enlarged tip to the raised locked orientation, a secondary trigger (156) having an upper end pivotally coupled to the housing forwardly of the primary spring, the secondary trigger having an upwardly facing notch (158) removably receiving a lower extent of the secondary trigger, a secondary spring (160) urging the secondary trigger forwardly to retain the forward extent of the primary lever beneath the chamber;

the trigger being formed of a bar (164) axially reciprocable in a direction of movement within the housing, the bar having a forward end (166) located in the C-shaped chamber when in a release orientation, the forward end located rearwardly of the chamber when slid rearwardly by the central shaft to the locked orientation, the bar having a rearward end (168) coupled to a central extent of the secondary trigger for moving the secondary trigger forwardly when in the locked orientation and for moving the secondary trigger rearwardly when in the release orientation;

an adjustment bolt (170) having a downwardly facing head with a hexagonal recess adapted to be twisted by a user to increase and decrease the tension on the primary spring to thereby allow the user to change the force needed to lock and unlock the system;

the operational components adapted to be applied to a conventional shoe whereby it is preferred to add a heel with an appropriate height to facilitate more comfortable walking.

\* \* \* \* \*